(12) United States Patent
Ide et al.

(10) Patent No.: US 9,509,233 B2
(45) Date of Patent: Nov. 29, 2016

(54) POWER CONVERTER, POWER GENERATION SYSTEM, CONTROL APPARATUS, AND POWER CONVERSION METHOD

(71) Applicant: KABUSHIKI KAISHA YASKAWA DENKI, Kitakyushu-shi (JP)

(72) Inventors: Kozo Ide, Fukuoka (JP); Tetsumi Narita, Fukuoka (JP); Seiji Fujisaki, Fukuoka (JP); Mamoru Takaki, Fukuoka (JP); Shinya Morimoto, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 129 days.

(21) Appl. No.: 14/663,460

(22) Filed: Mar. 20, 2015

(65) Prior Publication Data
US 2015/0280612 A1    Oct. 1, 2015

(30) Foreign Application Priority Data
Mar. 31, 2014  (JP) ................. 2014-072400

(51) Int. Cl.
*H02M 7/538* (2007.01)
*H02M 7/5387* (2007.01)
(Continued)

(52) U.S. Cl.
CPC .......... *H02M 7/53871* (2013.01); *H02J 3/385* (2013.01); *H02M 3/156* (2013.01); *H02M 7/5395* (2013.01); *H02M 2001/007* (2013.01); *H02M 2001/0025* (2013.01)

(58) Field of Classification Search
CPC .......... H02M 2001/007; H02M 7/48; H02M 7/53871; H02M 7/5387; H02M 1/12; H02M 3/158; H02M 1/4225; H02M 2001/0003; H02M 2001/0025; H02J 3/383; Y02E 10/563
See application file for complete search history.

(56) References Cited

U.S. PATENT DOCUMENTS 5,065,304 A * 11/1991 Tamai ............... H02M 7/53875
                                                             363/95
5,914,866 A *  6/1999 Eguchi ............... H02M 7/4807
                                                             363/131

(Continued)

FOREIGN PATENT DOCUMENTS

EP         2403123       1/2012
WO    WO 2013/069326    5/2013

OTHER PUBLICATIONS

Ahmed et al., "Dual-Mode Time-Sharing One-Stage Single-Phase Power Conditioner Using Sinewave Tracked Soft Switching PWM Boost Chopper", Conference Record of the 2005 IEEE Industry Applications Conference Fortieth, IAS Annual Meeting, Oct. 2, 2005, pp. 1612-1617, vol. 3, Hong Kong, China XP010842610.

(Continued)

*Primary Examiner* — Adolf Berhane
*Assistant Examiner* — Henry Lee, III
(74) *Attorney, Agent, or Firm* — Mori & Ward, LLP

(57) ABSTRACT

A power converter according to embodiments includes a boost circuit, a single-phase inverter, a current controller, and a power conversion controller. The current controller generates a voltage reference based on a difference between current output from the single-phase inverter and a current reference. The power conversion controller controls the single-phase inverter to generate a first portion of the AC voltage, and controls the boost circuit to generate a second portion of the AC voltage. The first portion corresponds to the voltage reference of which an absolute value is smaller than the voltage of the DC power supply. The second portion corresponds to the voltage reference of which an absolute value is greater than the voltage of the DC power supply.

12 Claims, 10 Drawing Sheets

(51) Int. Cl.
*H02M 3/156* (2006.01)
*H02J 3/38* (2006.01)
*H02M 7/5395* (2006.01)
*H02M 1/00* (2006.01)

(56) References Cited

U.S. PATENT DOCUMENTS

| | | | | |
|---|---|---|---|---|
| 6,362,985 B1* | 3/2002 | Haneda | ............. | H02M 7/53871 363/132 |
| 2007/0058406 A1 | 3/2007 | Inoshita et al. | | |
| 2009/0167224 A1* | 7/2009 | Miura | ................. | B62D 5/046 318/400.23 |
| 2012/0134191 A1* | 5/2012 | Yoneda | ................. | H01M 10/02 363/131 |
| 2012/0155126 A1* | 6/2012 | Yoneda | ................... | H02J 3/383 363/40 |
| 2012/0201064 A1 | 8/2012 | Asakura et al. | | |
| 2013/0307463 A1* | 11/2013 | Otsuka | ................. | H02M 5/293 318/800 |
| 2014/0049996 A1* | 2/2014 | Ku | ..................... | H02M 7/5388 363/71 |

OTHER PUBLICATIONS

Extended European Search Report for corresponding EP Application No. 15160493.1-1809, Sep. 25, 2015.

* cited by examiner

POWER CONVERTER, POWER GENERATION SYSTEM, CONTROL APPARATUS, AND POWER CONVERSION METHOD

CROSS-REFERENCE TO RELATED APPLICATION

This application is based upon and claims the benefit of priority of the prior Japanese Patent Application No. 2014-072400, filed on Mar. 31, 2014, the entire contents of which are incorporated herein by reference.

FIELD

The embodiments discussed herein are directed to a power converter, a power generation system, a control device, and a power conversion method.

BACKGROUND

Power converters are conventionally known, which include a boost circuit and a single-phase inverter and boost a voltage of a direct-current (DC) power supply with the boost circuit to output an alternating-current (AC) voltage having an amplitude greater than the voltage of the DC power supply from the single-phase inverter.

In connection with power converters of this type, PCT Publication No. WO 2013/069326 describes a technique of outputting AC voltage from a single-phase inverter by alternately carrying out boost control on a boost circuit and pulse width modulation (PWM) control on the single-phase inverter.

SUMMARY

A power converter according to an aspect of embodiments includes a boost circuit, a single-phase inverter, and a current controller. The boost circuit boosts a voltage of a direct-current (DC) power supply. The single-phase inverter outputs an alternating-current (AC) voltage based on a voltage output from the boost circuit. The current controller generates a voltage reference based on a difference between a current output from the single-phase inverter and a current reference. The power conversion controller controls the single-phase inverter to generate a first portion of the AC voltage, and controls the boost circuit to generate a second portion of the AC voltage. The first portion corresponds to a portion according to the voltage reference of which an absolute value is smaller than the voltage of the DC power supply. The second portion corresponds to a portion according to the voltage reference of which an absolute value is greater than the voltage of the DC power supply.

BRIEF DESCRIPTION OF DRAWINGS

More complete understanding of the embodiments and advantages attendant therewith will be apparent from the following detailed description of the embodiments when taken in conjunction with the accompanying drawings.

DESCRIPTION OF EMBODIMENTS

Embodiments of a power converter, a power generation system, a control apparatus, and a power conversion method disclosed by the subject application will be described in detail below with reference to the accompanying drawings. It should be noted that the present invention is not limited by the embodiments below. For example, although a solar cell is described below as an example of a DC power supply and a power generator, the DC power supply and the power generator may be a DC power generator or a fuel cell other than solar cells. The DC power supply may be configured to include, for example, an AC power supply (including an AC power generator) and a converter to convert AC power from the AC power supply into DC power with the converter and output the converted DC power.

1. First Embodiment

Figure 1:
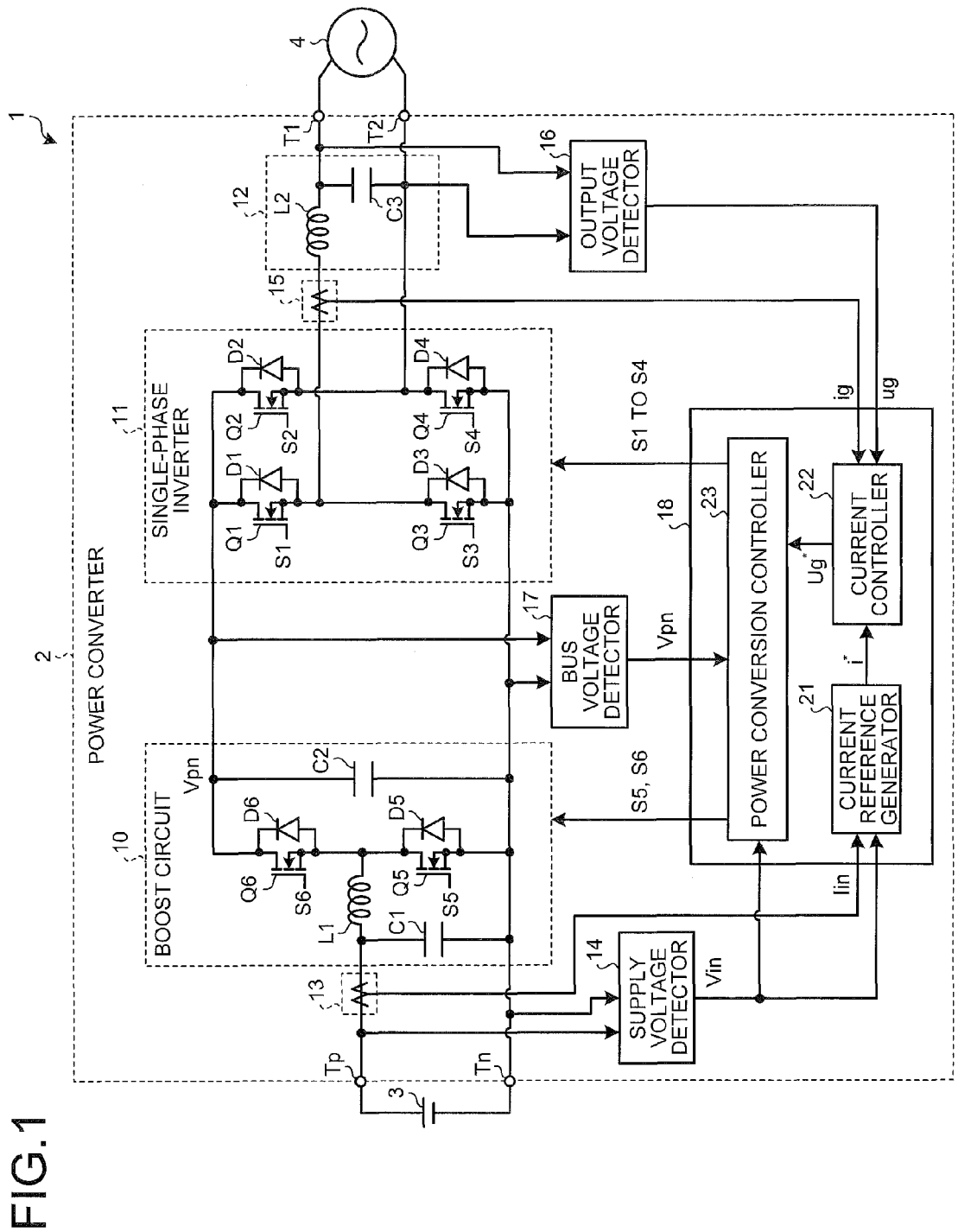
FIG. 1 is a diagram illustrating a configuration example of a power generation system according to a first embodiment.

FIG. 1 is a diagram illustrating a configuration example of a power generation system according to a first embodiment. As illustrated in FIG. 1, the power generation system 1 according to the first embodiment includes a power converter 2 and a solar cell 3. The power converter 2 converts DC power generated by the solar cell 3 into AC power, which is then output to an electric system 4. Although the power converter 2 is connected to the electric system 4 in the example illustrated in FIG. 1, the electric system 4 may be any load, for example, equipment operating with AC power.

1.1. Power Converter 2

The power converter 2 includes input terminals Tp, Tn, output terminals T1, T2, a boost circuit 10, a single-phase inverter 11, an output filter 12, a supply current detector 13, a supply voltage detector 14, an output current detector 15, an output voltage detector 16, a bus voltage detector 17, and a controller 18.

The input terminal Tp is connected to the positive electrode of the solar cell 3, and the input terminal Tn is connected to the negative electrode of the solar cell 3. The output terminals T1, T2 are connected to the electric system 4. A DC voltage input from the solar cell 3 through the input terminals Tp, Tn is converted into an AC voltage by the boost circuit 10 and the single-phase inverter 11, and the converted AC voltage is output from the output terminals T1, T2 to the electric system 4.

The boost circuit 10 has switching elements Q5, Q6, diodes D5, D6, a reactor L1, and capacitors C1, C2. The reactor L1 has one end connected to the solar cell 3.

The switching element Q5 is connected in parallel between the positive electrode and the negative electrode of the solar cell 3 through the reactor L1. The diode D5 is connected in inverse parallel with the switching element Q5. The switching element Q6 has one end connected to the connection point between the reactor L1 and the switching element Q5 and has the other end connected to the single-phase inverter 11. The diode D6 is connected in inverse parallel with the switching element Q6.

The capacitor C1 is connected between the positive electrode and the negative electrode of the solar cell 3 and suppresses voltage fluctuations between the input terminals Tp and Tn. The capacitor C2 is connected to the output side of the boost circuit 10 and smoothes the voltage boosted by the reactor L1 and the switching element Q5.

This boost circuit 10 controls the switching elements Q5, Q6 alternately to the on/off state and boosts the DC voltage output from the solar cell 3 to output the boosted voltage from the switching element Q6. The boost circuit 10 controls the switching element Q5 to the off state and the switching element Q6 to the on state to output the DC voltage output from the solar cell 3 from the switching element Q6.

In this manner, the boost circuit 10 can boost the DC voltage output from the solar cell 3 or output the DC voltage output from the solar cell 3 without increasing it.

The single-phase inverter 11 includes bridge-connected switching elements Q1 to Q4 and diodes D1 to D4 connected in inverse parallel with the switching elements Q1 to Q4, respectively. In this single-phase inverter 11, a bus voltage Vpn is converted into a positive AC voltage by turning on/off the switching elements Q1, Q4, and the bus voltage Vpn is converted into a negative AC voltage by turning on/off the switching elements Q2, Q3.

The single-phase inverter 11 controls the switching elements Q1, Q4 to the on state to output the bus voltage Vpn as a positive voltage and controls the switching elements Q2, Q3 to the on state to output the bus voltage Vpn as a negative voltage. In this manner, the single-phase inverter 11 can control the polarity of the output voltage and, in addition, can convert the bus voltage Vpn into an AC voltage waveform or output the bus voltage Vpn without conversion.

The switching elements Q1 to Q6 are, for example, wide-bandgap semiconductor containing gallium nitride (GaN) or silicon carbide (SiC). The switching elements Q1 to Q6 may be metal-oxide-semiconductor field-effect transistors (MOSFETs) or insulated gate bipolar transistors (IGBTs).

The output filter 12 is, for example, an LC filter having a reactor L2 and a capacitor C3 and is provided between the single-phase inverter 11 and the electric system 4. This output filter 12 removes switching noise resulting from switching of the switching elements Q1 to Q4 included in the single-phase inverter 11.

The supply current detector 13 detects an instantaneous value Iin (hereinafter also referred to as supply current Iin) of a DC current supplied from the solar cell 3 to the boost circuit 10. The supply voltage detector 14 detects an instantaneous value Vin (hereinafter also referred to as supply voltage Vin) of DC voltage supplied from the solar cell 3.

The supply current detector 13 detects a current, for example, using a Hall element that is a magnetic-to-electric conversion element.

The output current detector 15 detects an instantaneous value ig (hereinafter also referred to as output current ig) of an AC current supplied from the single-phase inverter 11 to the output filter 12. The output voltage detector 16 detects an instantaneous value ug (hereinafter also referred to as output voltage ug) of AC voltage supplied from the power converter 2 to the electric system 4. The output current detector 15 detects a current, for example, using a Hall element that is a magnetic-to-electric conversion element.

The bus voltage detector 17 detects an instantaneous value (hereinafter also referred to as bus voltage Vpn) of the bus voltage Vpn output from the boost circuit 10 to the single-phase inverter 11.

The controller 18 outputs gate signals S1 to S6 for controlling the boost circuit 10 and the single-phase inverter 11, based on the supply voltage Vin, the supply current Iin, the output current ig, the output voltage ug, and the bus voltage Vpn. The gate signals S1 to S6 are input to the respective gates of the corresponding switching elements Q1 to Q6 to control the switching elements Q1 to Q6.

This controller 18 includes a current reference generator 21, a current controller 22, and a power conversion controller 23. The current reference generator 21 generates a current reference i* so as to maximize power supplied from the solar cell 3 to the boost circuit 10, based on the supply current Iin and the supply voltage Vin.

The current controller 22 generates an AC voltage reference Ug* based on a difference between the current reference i* and the output current ig. If the AC voltage reference Ug* is equal to or smaller than the supply voltage Vin, the power conversion controller 23 generates the gate signals S1 to S4 according to the AC voltage reference Ug* to perform PWM control on the single-phase inverter 11. If the AC voltage reference Ug* is greater than the supply voltage Vin, the power conversion controller 23 generates the gate signals S5, S6 according to the AC voltage reference Ug* to perform boost control on the boost circuit 10.

Figure 2:
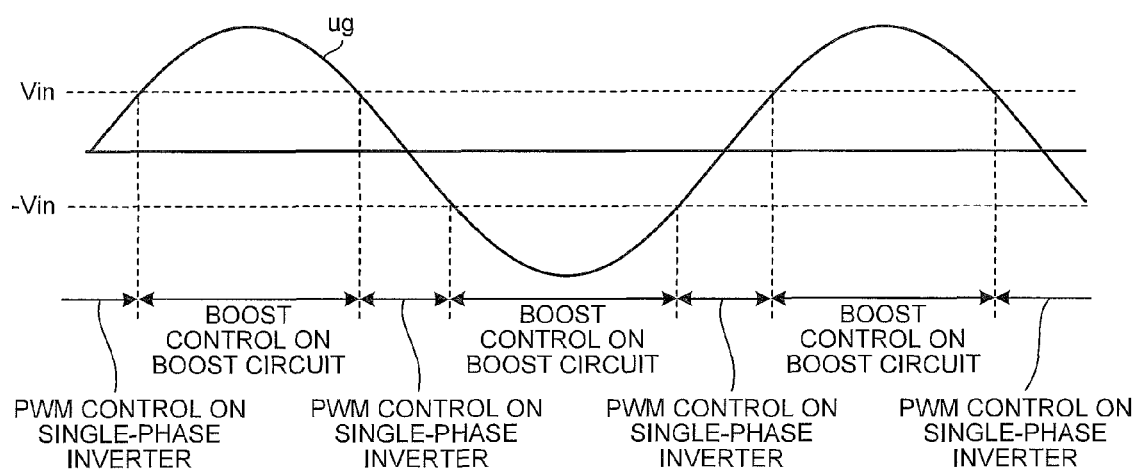
FIG. 2 is a diagram illustrating the relation between the control processing by the controller in FIG. 1 and output voltage.

FIG. 2 is a diagram illustrating the relation between the control processing for the boost circuit 10 and the single-phase inverter 11 by the controller 18, and the output voltage ug. The controller 18 outputs the output voltage ug according to the AC voltage reference Ug*, as illustrated in FIG. 2, by switching between the PWM control on the single-phase inverter 11 and the boost control on the boost circuit 10 in accordance with the relation in magnitude between the output voltage Ug* and the supply voltage Vin, as described above.

As described above, the controller 18 controls the boost circuit 10 and the single-phase inverter 11, based on the current control based on a difference between the current reference i* and the output current ig. A distortion of the output current ig thus can be suppressed during switching between the voltage control by the single-phase inverter 11 and the voltage control by the boost circuit 10. The current controller 22 of the controller 18 corresponds to an example of means for suppressing a distortion of the current output from the single-phase inverter 11.

The controller 18 controls the boost circuit 10 and the single-phase inverter 11 with the same AC voltage reference Ug*. A distortion of the output current ig thus can be further suppressed during switching between the voltage control by the single-phase inverter 11 and the voltage control by the boost circuit 10.

An example of a specific configuration of the controller 18 will be specifically described below with reference to FIG. 3 to FIG. 8. In the example described below, the scalar quantity of the d-axis component and the q-axis component of the current reference i* or the AC voltage reference Ug* is used for generation.

On the other hand, when the single-phase inverter generates a first portion and the boost circuit generates a second portion in which the first portion is a portion in which the absolute value of output AC voltage is smaller than the voltage of the DC power supply and the second portion is a portion in which the absolute value of output AC voltage is greater than the voltage of the DC power supply, it is assumed that the boost control on the boost circuit and the PWM control on the single-phase inverter are both performed to suppress a distortion of the AC voltage waveform during switching in a predetermined period before and after switching between the boost and PWM controls. In this case, it is effective to suppress a distortion of the AC voltage waveform, but it is difficult to suppress a distortion of the AC current waveform, during switching between the boost and PWM controls.

1.2. Controller 18

Figure 3:
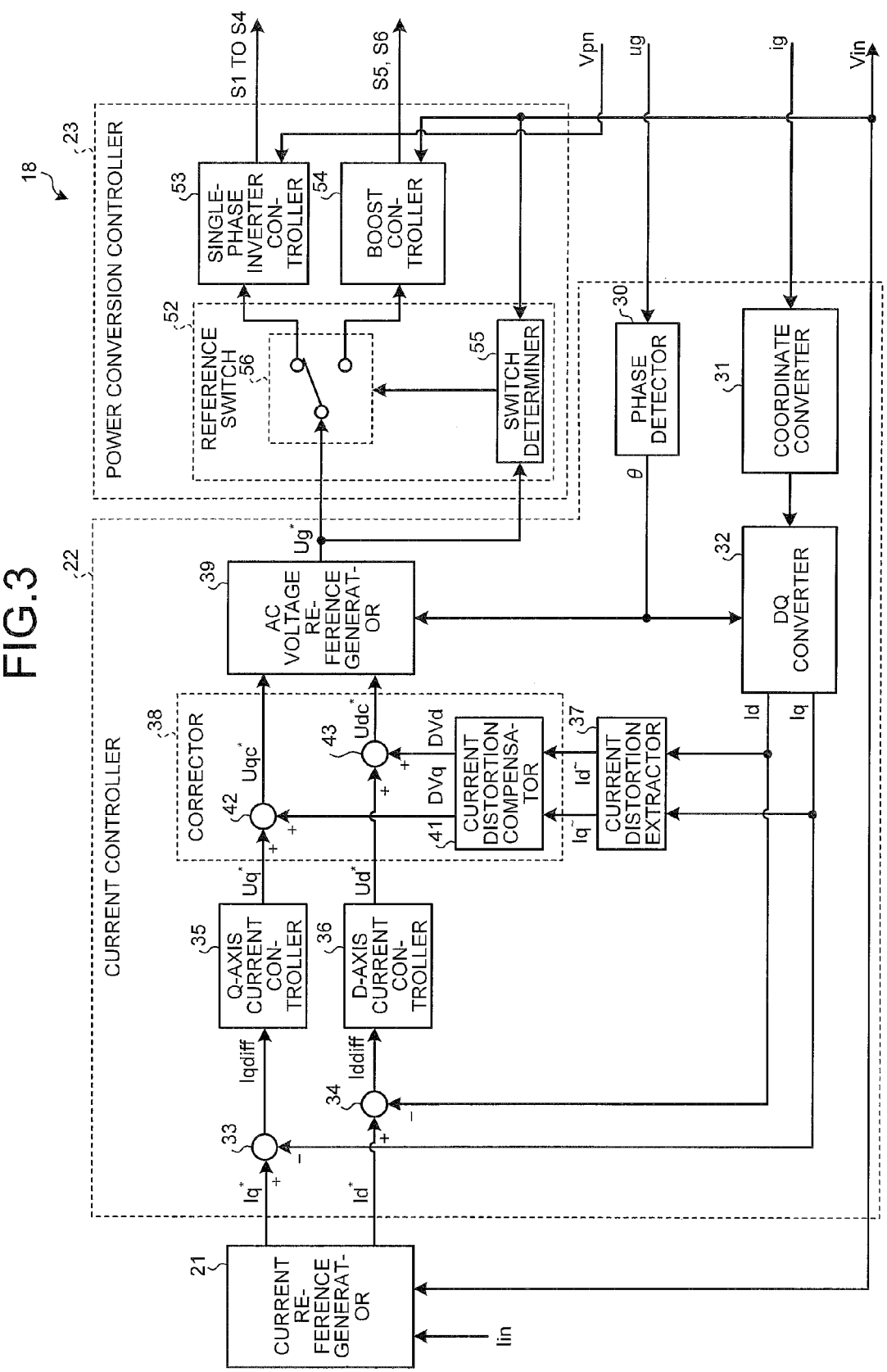
FIG. 3 is a diagram illustrating a configuration example of the controller of the power converter in FIG. 1.

FIG. 3 is a diagram illustrating a configuration example of the controller 18. As illustrated in FIG. 3, the controller 18 includes a current reference generator 21, a current controller 22, and a power conversion controller 23.

The controller 18 includes, for example, a microcomputer including a central processing unit (CPU), a read only memory (ROM), a random access memory (RAM), and an input/output port, and a variety of circuits. The CPU of such a microcomputer reads out and executes a computer program stored in the ROM to implement control on the current reference generator 21, the current controller 22, and the power conversion controller 23. At least some or all of the current reference generator 21, the current controller 22, and the power conversion controller 23 may be configured with hardware such as an application specific integrated circuit (ASIC) or a field programmable gate array (FPGA).

1.2.1. Current Reference Generator 21

The current reference generator 21 generates a current reference i* so as to maximize the power supplied from the solar cell 3 to the boost circuit 10, based on the supply current Iin input from the supply current detector 13 and the supply voltage Vin input from the supply voltage detector 14.

The current reference i* described above includes a q-axis current reference Iq* as a q-axis component and a d-axis current reference Id* as a d-axis component. The q-axis current reference Iq* is a reference for an active component of the output current ig from the power converter 2 to the electric system 4, and the d-axis current reference Id* is a reference for a reactive component of the output current ig from the power converter 2 to the electric system 4.

Figure 4:
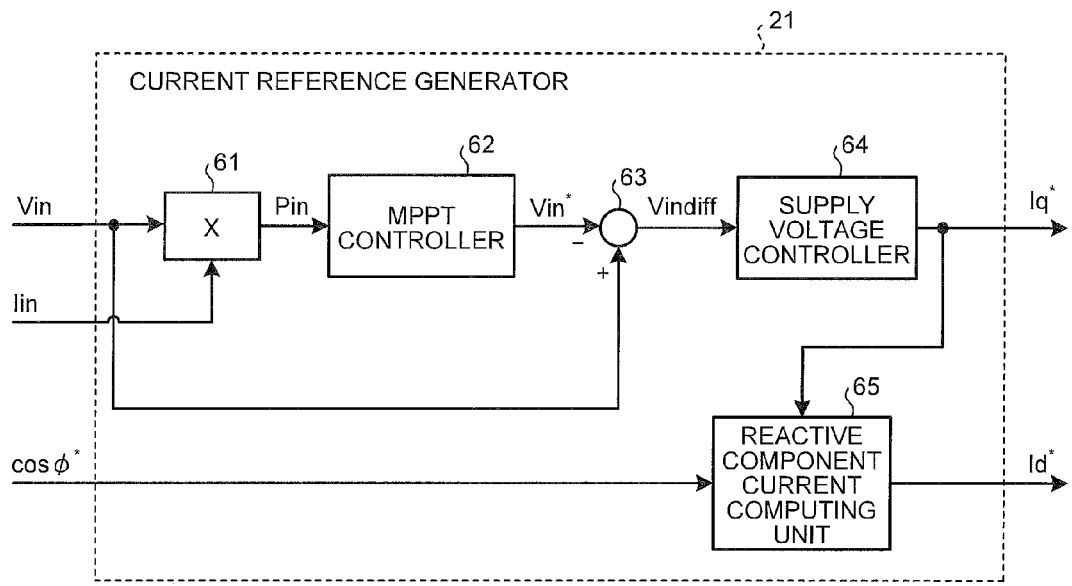
FIG. 4 is a diagram illustrating a configuration example of the current reference generator in FIG. 3.

FIG. 4 is a diagram illustrating a configuration example of the current reference generator 21. As illustrated in FIG. 4, the current reference generator 21 includes a multiplier 61, a maximum power point tracking (MPPT) controller 62, a subtractor 63, a supply voltage controller 64, and a reactive component current computing unit 65.

The multiplier 61 multiplies the supply voltage Vin by the supply current Iin to obtain a DC power Pin supplied to the boost circuit 10. The MPPT controller 62 generates a supply voltage reference Vin* so as to maximize the DC power Pin. The MPPT controller 62 generates the supply voltage reference Vin* that maximizes the DC power Pin, for example, by adjusting the supply voltage reference Vin* such that a change of the DC power Pin becomes zero.

For example, when the DC power Pin decreases, the MPPT controller 62 adds the previously generated supply voltage reference Vin* (hereinafter referred to as the previous value Vin') and a predetermined value ΔV to generate the supply voltage reference Vin*. When the DC power Pin increases, the MPPT controller 62 subtracts a predetermined value ΔV from the previous value Vin' to generate the supply voltage reference Vin*.

The subtractor 63 calculates a difference Vindiff by subtracting the supply voltage Vin from the supply voltage reference Vin* and outputs the difference Vindiff to the supply voltage controller 64. The supply voltage controller 64 adjusts the q-axis current reference Iq* such that the difference Vindiff becomes zero, for example, by performing proportional-plus-integral control (PI control).

The reactive component current computing unit 65 generates the d-axis current reference Id* based on the q-axis current reference Iq* and a power factor reference cos φ*. The reactive component current computing unit 65, for example, computes a sin φ* from the cos φ* and performs computation such that Iq*×(sin φ*/cos φ*)=Id*. The method of generating the d-axis current reference Id* is not limited to the generation method based on the q-axis current reference Iq* and the power factor reference cos φ*.

For example, the reactive component current computing unit 65 may output a signal for detecting whether the power converter 2 operates alone for the electric system 4, as the d-axis current reference Id*.

1.2.2. Current Controller 22

The current controller 22 generates the AC voltage reference Ug* based on a difference between the current reference i* and the output current ig. This current controller 22 includes a phase detector 30, a coordinate converter 31, a dq converter 32, subtractors 33, 34, a q-axis current controller 35, a d-axis current controller 36, a current distortion extractor 37, a corrector 38, and an AC voltage reference generator 39. The current controller 22 is an example of means for suppressing a distortion of output current during switching between voltage control by the single-phase inverter and voltage control by the boost circuit.

The phase detector 30 detects a phase θ (hereinafter referred to as output voltage phase θ) of the output voltage ug supplied from the power converter 2 to the electric system 4. The phase detector 30 is configured with, for example, a phase locked loop (PLL). The output voltage ug corresponds to the voltage of the electric system 4.

The coordinate converter 31 converts the output current ig output from the single-phase inverter 11 to the output filter 12 into a pair of signals orthogonal to each other on the orthogonal coordinates. The coordinate converter 31 generates, for example, a first signal synchronized with the phase of the output current ig and a second signal 90 degrees behind the phase of the output current ig, based on the output current ig.

The dq converter 32 converts the first and second signals generated by the coordinate converter 31 into dq components on the dq coordinate system, through rotation coordinate transformation, based on the output voltage phase θ. The dq converter 32 thus obtains current Id having a d-axis component (hereinafter referred to as d-axis current Id) and current Iq having a q-axis component (hereinafter referred to as q-axis current Iq). The q-axis current Iq corresponds to the active current of the output current ig, and the d-axis current Id corresponds to the reactive current of the output current ig.

The subtractor 33 calculates a q-axis current difference Iqdiff by subtracting the q-axis current Iq from the q-axis current reference Iq* and outputs the q-axis current difference Iqdiff to the q-axis current controller 35. The q-axis current controller 35 adjusts the q-axis voltage reference Uq* such that the q-axis current difference Iqdiff becomes zero, for example, by performing PI (proportional-plus-integral) control, and outputs the adjusted q-axis voltage reference Uq* to the corrector 38.

The subtractor 34 calculates a d-axis current difference Iddiff by subtracting the d-axis current Id from the d-axis current reference Id* and outputs the d-axis current difference Iddiff to the d-axis current controller 36. The d-axis current controller 36 adjusts the d-axis voltage reference Ud* such that the d-axis current difference Iddiff become zero, for example, by performing PI control, and outputs the adjusted d-axis voltage reference Ud* to the corrector 38.

The current distortion extractor 37 extracts a distortion component of the output current ig of the single-phase inverter 11. The distortion component extracted here of the output current ig occurs in a frequency band equal to or higher than the cut-off frequency of the q-axis current controller 35 and the d-axis current controller 36 and equal to or lower than the switching frequency of the single-phase inverter 11.

As illustrated in FIG. 2, the point of switching between the boost control on the boost circuit 10 and the PWM control on the single-phase inverter 11 occurs four times in each cycle of the output voltage ug. The distortion of the output current ig caused by the switching between the boost control on the boost circuit 10 and the PWM control on the single-phase inverter 11 therefore includes third to seventh harmonics relative to the frequency of the output voltage ug. The current distortion extractor 37 then extracts the distortion of the output current ig by removing the DC component and the high frequency component of the output current ig.

Figure 5:
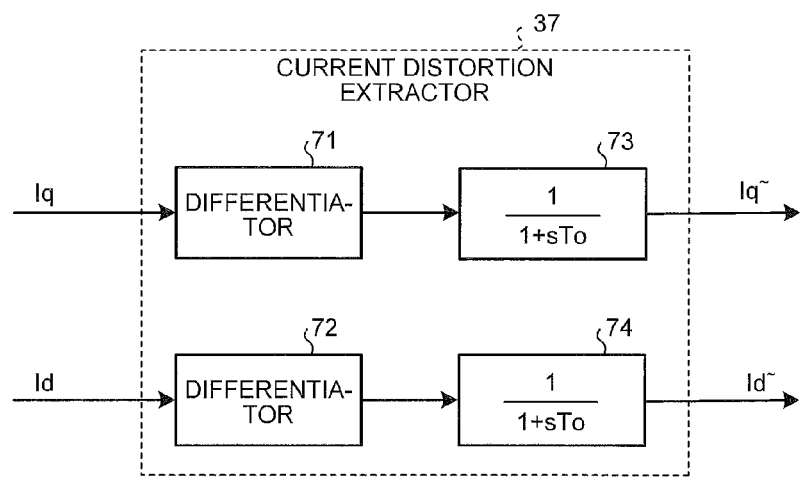
FIG. 5 is a diagram illustrating a configuration example of the current distortion extractor in FIG. 3.

FIG. 5 is a diagram illustrating a configuration example of the current distortion extractor 37. As illustrated in FIG. 5, the current distortion extractor 37 includes differentiators 71, 72 and low-pass filters 73, 74.

The differentiator 71 removes the DC component of the q-axis current Iq, and the low-pass filter 73 removes the high frequency component of the q-axis current Iq from which the DC component has been removed. The current distortion extractor 37 thus extracts a q-axis current harmonic component Iq~ that is the q-axis harmonic component of the output current ig.

The differentiator 72 removes the DC component of the d-axis current Id, and the low-pass filter 74 removes the high frequency component of the d-axis current Id from which the DC component has been removed. The current distortion extractor 37 thus extracts a d-axis current harmonic component Id~ that is the d-axis harmonic component of the output current ig.

As illustrated in FIG. 5, the low-pass filters 73, 74 are configured using a filter including an integration element to suppress a phase change. The cut-off frequency of the low-pass filters 73, 74 is set to be equal to or higher than the cut-off frequency of the q-axis current controller 35 and the d-axis current controller 36 and to be equal to or lower than the switching frequency (carrier frequency) of the single-phase inverter 11.

Returning to FIG. 3, the description of the controller 18 continues. The corrector 38 generates a q-axis voltage reference Uqc* and a d-axis voltage reference Udc* by performing current distortion compensation on the q-axis voltage reference Uq* and the d-axis voltage reference Ud*, based on the q-axis current harmonic component Iq~ and the d-axis current harmonic component Id~ extracted by the current distortion extractor 37.

The corrector 38 includes a current distortion compensator 41 and adders 42, 43. The current distortion compensator 41 generates a q-axis distortion compensation value DVq and a d-axis distortion compensation value DVd for performing current distortion compensation on the q-axis voltage reference Uq* and the d-axis voltage reference Ud*, based on the q-axis current harmonic component Iq~ and the d-axis current harmonic component Id~.

Figure 6:
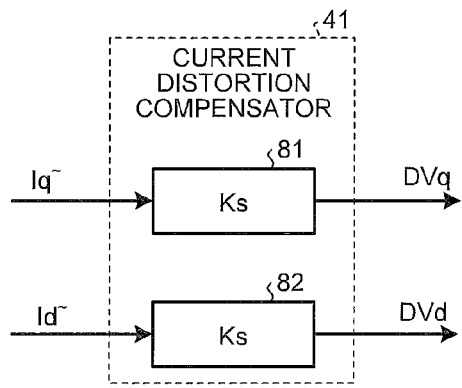
FIG. 6 is a diagram illustrating a configuration example of the current distortion compensator in FIG. 3.

FIG. 6 is a diagram illustrating a configuration example of the current distortion compensator 41. As illustrated in FIG. 6, the current distortion compensator 41 includes amplifiers 81, 82 having a control gain Ks. The amplifier 81 obtains the q-axis distortion compensation value DVq by multiplying the q-axis current harmonic component Iq~ by the control gain Ks. The amplifier 82 obtains the d-axis distortion compensation value DVd by multiplying the d-axis current harmonic component Id~ by the control gain Ks.

Returning to FIG. 3, the description of the corrector 38 continues. The adder 42 obtains the q-axis voltage reference Uqc* including distortion compensation by adding the q-axis distortion compensation value DVq to the q-axis voltage reference Uq*. The adder 43 obtains the d-axis voltage reference Udc* including distortion compensation by adding the d-axis distortion compensation value DVd to the d-axis voltage reference Ud. The degree of attenuation of current distortion can be adjusted by adjusting the control gain Ks of the current distortion compensator 41.

The AC voltage reference generator 39 generates the AC voltage reference Ug* based on the q-axis voltage reference Uqc*, the d-axis voltage reference Udc*, and the output voltage phase θ. For example, the AC voltage reference generator 39 computes the amplitude M of the AC voltage reference Ug* using the equation (1) below and computes the phase θa of the AC voltage reference Ug* using the equation (2) below. The AC voltage reference generator 39 then computes a phase θv by adding the phase θa to the output voltage phase θ. The AC voltage reference generator 39 generates the AC voltage reference Ug* (=M×sin θv), for example, by computing M×sin θv.

$$M = \sqrt{Udc^{*2} + Uqc^{*2}} \tag{1}$$

$$\theta a = \tan^{-1}(Uqc^*/Udc^*) \tag{2}$$

1.2.3. Power Conversion Controller 23

When the AC voltage reference Ug* is equal to or smaller than the supply voltage Vin, the power conversion controller 23 performs PWM control on the single-phase inverter 11 based on the AC voltage reference Ug*. When the AC voltage reference Ug* is not equal to or smaller than the supply voltage Vin, the power conversion controller 23 performs boost control on the boost circuit 10 based on the AC voltage reference Ug*. This power conversion controller 23 includes a reference switch 52, a single-phase inverter controller 53, and a boost controller 54.

The reference switch 52 includes a switching determiner 55 and a switch 56. The switching determiner 55 determines whether the absolute value of the AC voltage reference Ug* is equal to or smaller than the supply voltage Vin. When determining that the absolute value of the AC voltage reference Ug* is equal to or smaller than the supply voltage Vin, the switching determiner 55 requests the switch 56 to output the AC voltage reference Ug* to the single-phase inverter controller 53. On the other hand, when determining that the absolute value of the AC voltage reference Ug* is greater than the supply voltage Vin, the switching determiner 55 requests the switch 56 to output the AC voltage reference Ug* to the boost controller 54.

The switch 56 outputs the AC voltage reference Ug* to the destination according to the request from the switching determiner 55. The switching determiner 55 is not limited to the configuration illustrated in FIG. 3 and may have any other configuration. For example, the AC voltage reference Ug* may be input to the single-phase inverter controller 53 and the boost controller 54 without provision of the switch 56 in the switching determiner 55, and one of the single-phase inverter controller 53 and the boost controller 54 may operate under the control of the switching determiner 55.

In this case, for example, when determining that the absolute value of the AC voltage reference Ug* is equal to or smaller than the supply voltage Vin, the switching determiner 55 requests the single-phase inverter controller 53 to output the gate signals S1 to S4 according to the AC voltage reference Ug*. For example, when determining that the absolute value of the AC voltage reference Ug* is greater than the supply voltage Vin, the switching determiner 55 requests the boost controller 54 to output the gate signals S5, S6 according to the AC voltage reference Ug*. The reference switch 52 is an example of means for switching between voltage control by the boost circuit and voltage control by the single-phase inverter.

When the absolute value of the AC voltage reference Ug* is equal to or smaller than the supply voltage Vin, the single-phase inverter controller 53 outputs the gate signals S1 to S4 according to the AC voltage reference Ug*. Specifically, the single-phase inverter controller 53 obtains a percent modulation α1 based on a reference voltage Vref, the bus voltage Vpn, and the AC voltage reference Ug*. For example, the single-phase inverter controller 53 obtains the percent modulation α1 through computation of the equation (3) below. The reference voltage Vref is a parameter preset in the single-phase inverter controller 53.

$$\alpha 1 = Ug^* \times \frac{Vref}{Vpn} \tag{3}$$

The single-phase inverter controller 53 compares the percent modulation α1 with the carrier signal to generate a PWM signal. The single-phase inverter controller 53 outputs the generated PWM signal as gate signals S1, S4 if the polarity of the AC voltage reference Ug* is positive, and outputs the generated PWM signal as gate signals S2, S3 if the polarity of the AC voltage reference Ug* is negative.

When the absolute value of the AC voltage reference Ug* is greater than the supply voltage Vin, the single-phase inverter controller 53 outputs the gate signals S1 to S4 according to the polarity of the AC voltage reference Ug*. For example, if the polarity of the AC voltage reference Ug* is positive, the single-phase inverter controller 53 sets the gate signals S1, S4 to a High level and sets the gate signals S2, S3 to a Low level. A positive voltage is then output from the single-phase inverter 11. If the polarity of the AC voltage reference Ug* is negative, the single-phase inverter controller 53 sets the gate signals S2, S3 to a High level and sets the gate signals S1, S4 to a Low level. A negative voltage is then output from the single-phase inverter 11.

When the absolute value of the AC voltage reference Ug* is equal to or smaller than the supply voltage Vin, the boost controller 54 outputs the gate signal S5 at a Low level and the gate signal S6 at a High level. The switching element Q5 is in turn turned off, and the switching element Q6 is turned on, so that the supply voltage Vin is output to the single-phase inverter 11 through the reactor L1 and the switching element Q6.

When the absolute value of the AC voltage reference Ug* is greater than the supply voltage Vin, the boost controller 54 outputs the gate signals S5, S6 according to the AC voltage reference Ug*. For example, the boost controller 54 obtains a percent modulation α2 through computation of the equation (4) below and compares the obtained percent modulation α2 with the carrier signal to generate a pair of PWM signals in which the Low level and the High level are reversed. The boost controller 54 outputs the generated pair of PWM signals as a pair of gate signals S5, S6.

$$\alpha 2 = \frac{(|Ug^*| - Vin)}{|Ug^*|} \tag{4}$$

Figure 7:
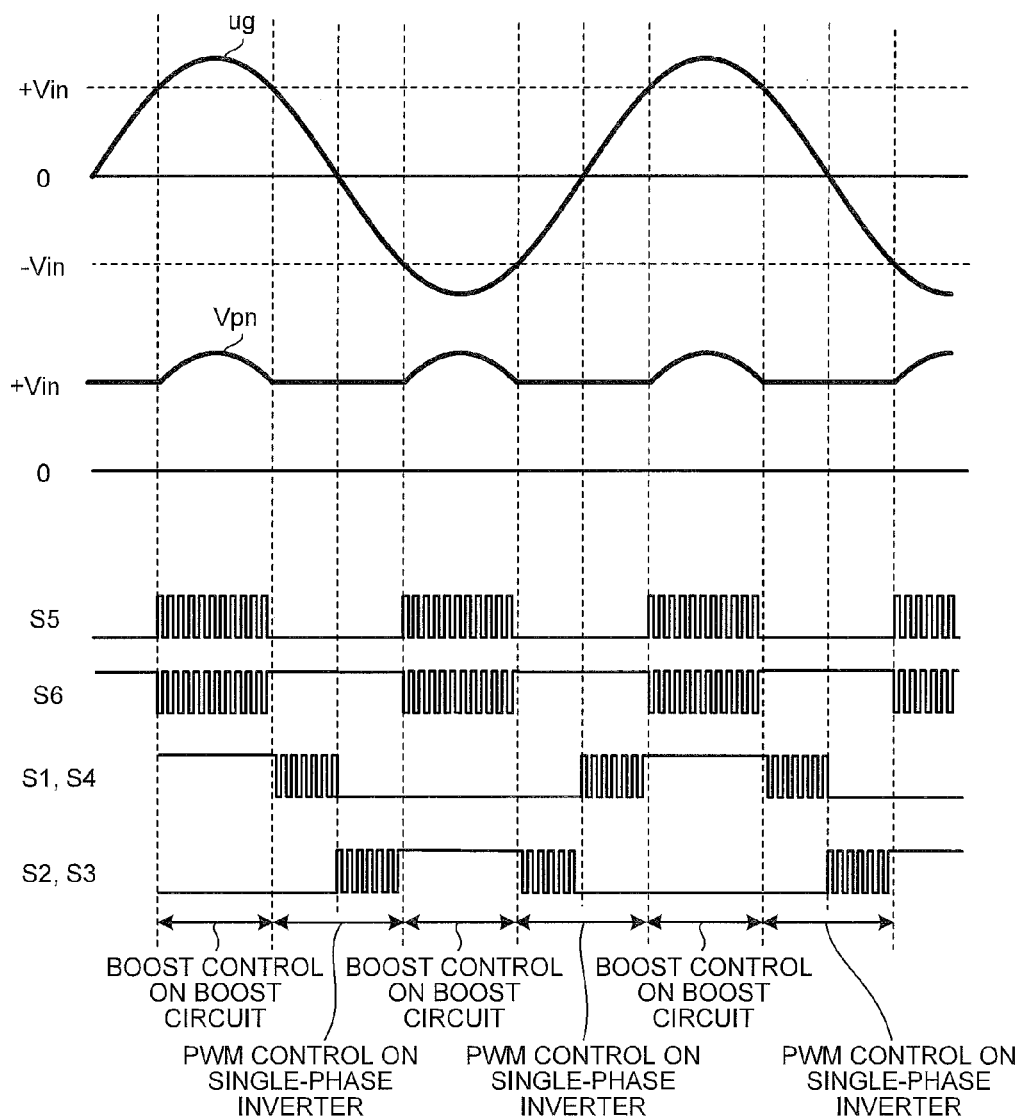
FIG. 7 is a diagram illustrating an exemplary relation between gate signals output from the controller in FIG. 3, output voltage, and bus voltage.

FIG. 7 is a diagram illustrating an exemplary relation between the gate signals S1 to S6 output from the power conversion controller 23, the output voltage ug, and the bus voltage Vpn. As illustrated in FIG. 7, when the absolute value of the AC voltage reference Ug* is equal to or smaller than the supply voltage Vin, the boost circuit 10 does not carry out boost operation, and the single-phase inverter 11 controls the polarity of the output voltage and also allows the switching elements Q1 to Q4 to switch under PWM control and outputs a voltage according to the AC voltage reference Ug* at that time. The waveform of the output voltage ug in a portion in which the absolute value of the AC voltage reference Ug* is smaller than the supply voltage Vin is thus generated.

When the absolute value of the AC voltage reference Ug* is greater than the supply voltage Vin, the boost circuit 10 allows the switching elements Q5, Q6 to switch under PWM control and boosts the bus voltage Vpn in accordance with the AC voltage reference Ug* at that time, and the single-phase inverter 11 outputs voltage by turning on only the switching elements corresponding to the polarity of the output voltage. The waveform of the output voltage ug in a portion in which the absolute value of the AC voltage reference Ug* is greater than the supply voltage Vin is thus generated.

1.3. Process Procedure by Controller 18

Figure 8:
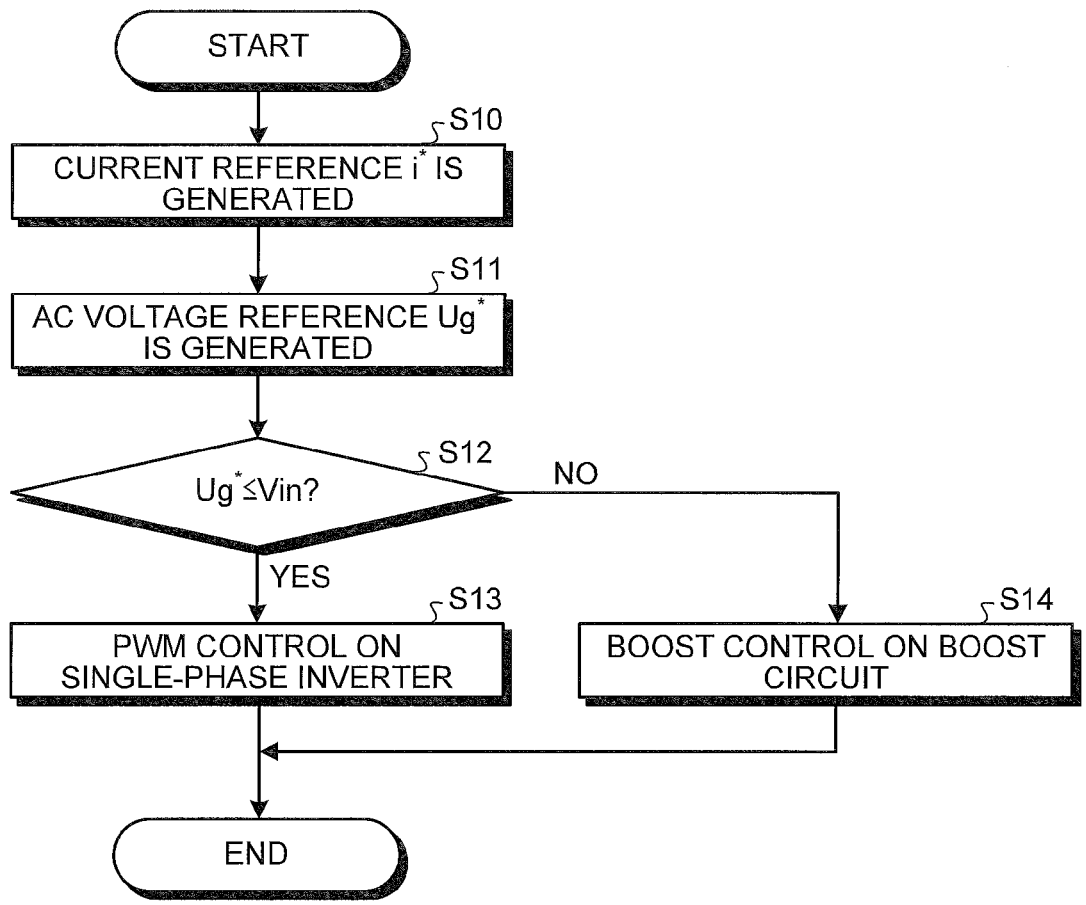
FIG. 8 is a flowchart illustrating an example of the processing by the controller in FIG. 1.

FIG. 8 is a flowchart illustrating an example of the control processing by the controller 18. Such control processing is repeatedly executed, for example, at predetermined intervals. As illustrated in FIG. 8, the controller 18 generates the current reference i* so as to maximize power supplied from the solar cell 3 to the boost circuit 10, based on the supply current Iin and the supply voltage Vin (step S10).

The controller 18 then generates the AC voltage reference Ug* based on a difference between the current reference i* and the output current ig (step S11). In such processing, the controller 18 can generate the AC voltage reference Ug*, for example, so as to compensate for a distortion of the output current ig. The distortion compensation of the output current ig is performed, for example, by extracting a distortion component of the output current ig and compensating the AC voltage reference Ug* based on a compensation value according to the extracted distortion component.

The controller 18 then determines whether the AC voltage reference Ug* is equal to or smaller than the supply voltage Vin (step S12). If the controller 18 determines that the AC voltage reference Ug* is equal to or smaller than the supply voltage Vin (Yes at step S12), the process proceeds to step S13. On the other hand, if the controller 18 determines that the AC voltage reference Ug* is not equal to or smaller than the supply voltage Vin (No at step S12), the process proceeds to step S14.

When the process proceeds to step S13, the controller 18 performs PWM control on the single-phase inverter 11 based on the AC voltage reference Ug*. At step S13, the controller 18 controls the switching element Q5 to the off state and the switching element Q6 to the on state without performing boost control on the boost circuit 10. The supply voltage Vin is thus supplied to the single-phase inverter 11 through the reactor L1 and the switching element Q6, and voltage having an AC waveform according to the AC voltage reference Ug* is output by turning on/off the switching elements Q1 to Q4.

On the other hand, when the process proceeds to step S14, the controller 18 performs boost control on the boost circuit 10 based on the AC voltage reference Ug*. At step S14, the controller 18 controls the single-phase inverter 11 such that the switching elements corresponding to the polarity of the AC voltage reference Ug* are turned on, without performing PWM control on the single-phase inverter 11. The supply voltage Vin is thus boosted to the AC waveform according to the AC voltage reference Ug* and is supplied from the boost circuit 10 to the single-phase inverter 11, and the voltage having such an AC waveform is output from the single-phase inverter 11 with the polarity according to the AC voltage reference Ug*.

As described above, the power generation system 1 according to the first embodiment includes the power converter 2 and the solar cell 3 (an example of the DC power supply and the power generator) supplying DC power to the power converter 2. The controller 18 of the power converter 2 generates, in the single-phase inverter 11, the waveform of the output voltage ug according to the AC voltage reference Ug* of which the absolute value is smaller than the supply voltage Vin, and generates, the boost circuit 10, the waveform of the output voltage ug according to the AC voltage reference Ug* of which the absolute value is greater than the supply voltage Vin. Accordingly, for example, the reactor L1 and the capacitor C2 as passive components can be reduced in size, thereby reducing the size of the power generation system 1 and the power converter 2.

The controller 18 further controls the boost circuit 10 and the single-phase inverter 11 using the AC voltage reference Ug* generated based on current control according to a difference between the current reference i* (Iq*, Id*) and the output current ig (Iq, Id). A distortion of the output current ig thus can be suppressed during switching between the voltage control by the single-phase inverter 11 and the voltage control by the boost circuit 10.

The controller 18 generates the supply voltage reference Vin* such that power supplied from the solar cell 3 to the boost circuit 10 is maximized, based on the supply voltage Vin and the supply current Iin. The controller 18 then generates the current reference i* (Iq*, Id*), based on a difference between the supply voltage reference Vin* and the supply voltage Vin. The current reference i* (Iq*, Id*) thus can be generated such that DC power is efficiently output from the solar cell 3.

The controller 18 includes the reference switch 52 (an example of the switch), the single-phase inverter controller 53, and the boost controller 54. The reference switch 52 switches between the boost control on the boost circuit 10 by the boost controller 54 and the PWM control on the single-phase inverter 11 by the single-phase inverter controller 53, based on the AC voltage reference Ug* and the supply voltage Vin. That is, the controller 18 controls the boost circuit 10 and the single-phase inverter 11 with the same AC voltage reference Ug*. A distortion of the output current ig thus can be further suppressed during switching between the voltage control by the single-phase inverter 11 and the voltage control by the boost circuit 10.

The controller 18 also includes the current distortion extractor 37 for extracting the distortion components $Iq\sim$, $Id\sim$ of current output from the single-phase inverter 11, and the corrector 38 for correcting the voltage references Uq*, Ud* based on the distortion components $Iq\sim$, $Id\sim$ extracted by the current distortion extractor 37. The controller 18 controls the boost circuit 10 and the single-phase inverter 11 based on the voltage references Uqc*, Udc* corrected by the corrector 38. Accordingly, the distortion component of the output current ig in a frequency band equal to or higher than the cut-off frequency of the q-axis and d-axis current controllers 35, 36 and equal to or lower than the switching frequency of the single-phase inverter 11 can be reduced, so that a distortion of the output current ig of the power converter 2 can be further reduced.

The controller 18 converts a pair of signals into a d-axis component and a q-axis component in the dq coordinate system through rotation coordinate transformation with the output voltage phase $\theta$ and generates the d-axis current reference Id* and the q-axis current reference Iq* as the current reference i*. The controller 18 then generates the d-axis voltage reference Ud* according to a difference between the d-axis current reference Id* and the d-axis current Id, and the q-axis voltage reference Uq* according to a difference between the q-axis current reference Iq and the q-axis current Iq. The d-axis component and the q-axis component of the current reference i* or the AC voltage reference Ug* thus can be handled as a scalar quantity, thereby facilitating the processing of generating a current reference or a voltage reference.

The controller 18 controls the boost circuit 10 to alternately turn on the switching element Q5 (an example of the first switching element) and the switching element Q6 (an example of the second switching element) in a period in which the waveform of the output voltage ug in a portion in which the absolute value of the AC voltage reference Ug* is greater than the supply voltage Vin is generated. Accordingly, in the power converter 2, even when a low-load state or a no-load state occurs in a period in which the absolute value of the AC voltage reference Ug* is greater than the supply voltage Vin, the electric charge in the capacitor C2 can be dissipated to the DC power supply side through the switching element Q6 and the reactor L1. Reduction of the accuracy in generating the waveform of the output voltage ug thus can be prevented.

The switching elements Q1 to Q4, the switching elements Q5, Q6, or both sets are wide-bandgap semiconductors containing gallium nitride (GaN) or silicon carbide (SiC). A change in system impedance or load connected to the output of the power converter 2 thus can be actively compensated for.

2. Second Embodiment

A power converter in a power generation system according to a second embodiment will now be described. The power converter according to the second embodiment differs from the power converter 2 according to the first embodiment in that a distortion of the output voltage ug is compensated for, in addition to a distortion of the output current ig. The second embodiment has the same configuration as the power generation system 1 according to the first embodiment except the configuration of the controller of the power converter, and illustration and description thereof are omitted. The components having the same function as in the power converter 2 in the first embodiment are denoted with the same reference signs and an overlapping description is omitted.

Figure 9:
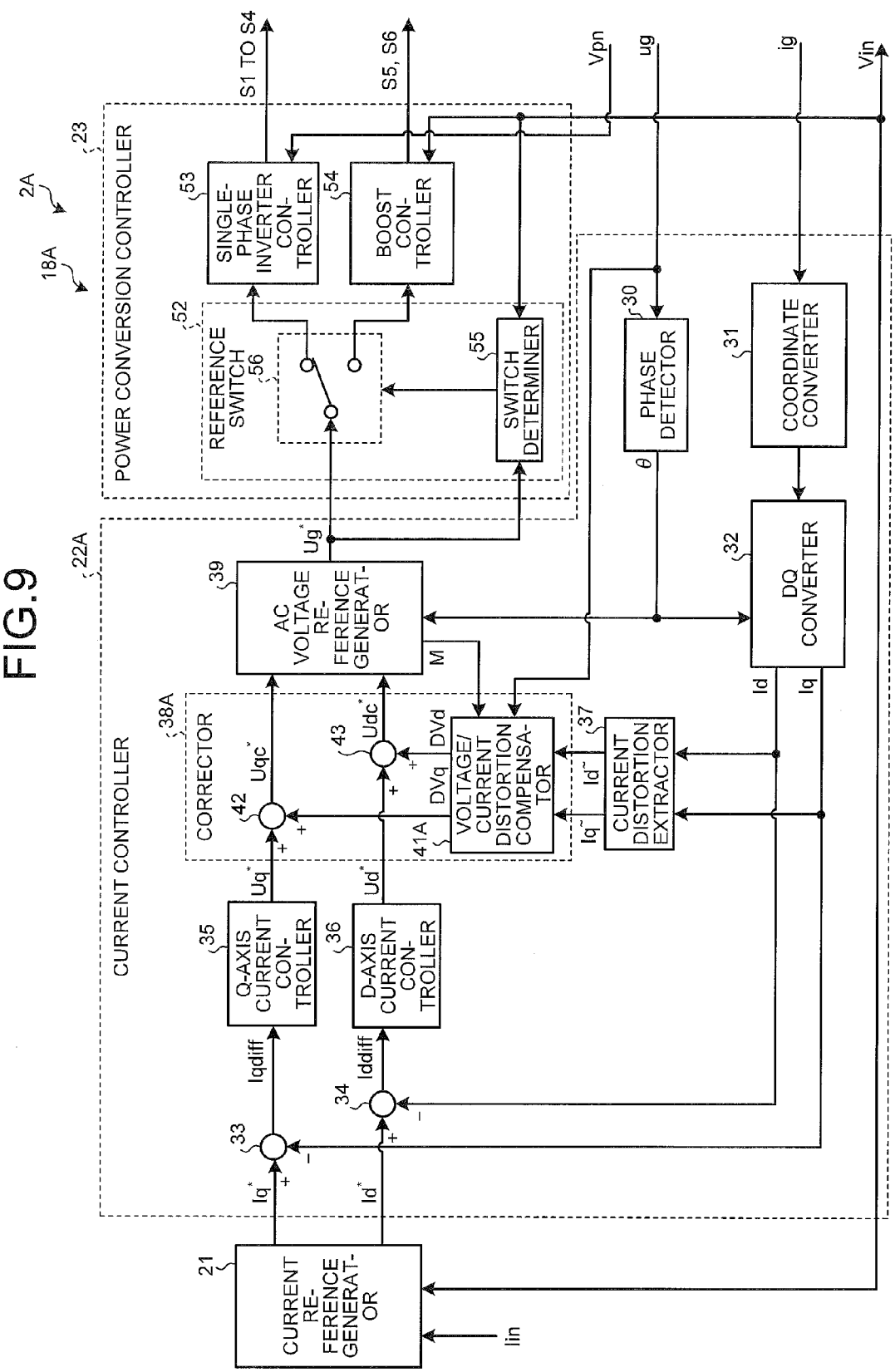
FIG. 9 is a diagram illustrating a configuration example of the controller of the power converter in a power generation system according to a second embodiment.

FIG. 9 is a diagram illustrating a configuration of a controller 18A of a power converter 2A according to the second embodiment. As illustrated in FIG. 9, the controller 18A of the power converter 2A includes a current reference generator 21, a current controller 22A, and a power conversion controller 23.

The current controller 22A differs from the current controller 22 according to the first embodiment in that the corrector 38 is replaced by a corrector 38A. The corrector 38A includes a voltage/current distortion compensator 41A and adders 42, 43.

The voltage/current distortion compensator 41A generates a q-axis distortion compensation value DVq and a d-axis distortion compensation value DVd, based on the q-axis current harmonic component Iq~, the d-axis current harmonic component Id~, the AC voltage reference Ug*, and the output voltage ug. The q-axis distortion compensation value DVq and the d-axis distortion compensation value DVd are compensation values for compensating the q-axis voltage reference Uq* and the d-axis voltage reference Ud* for a distortion of voltage and current.

Figure 10:
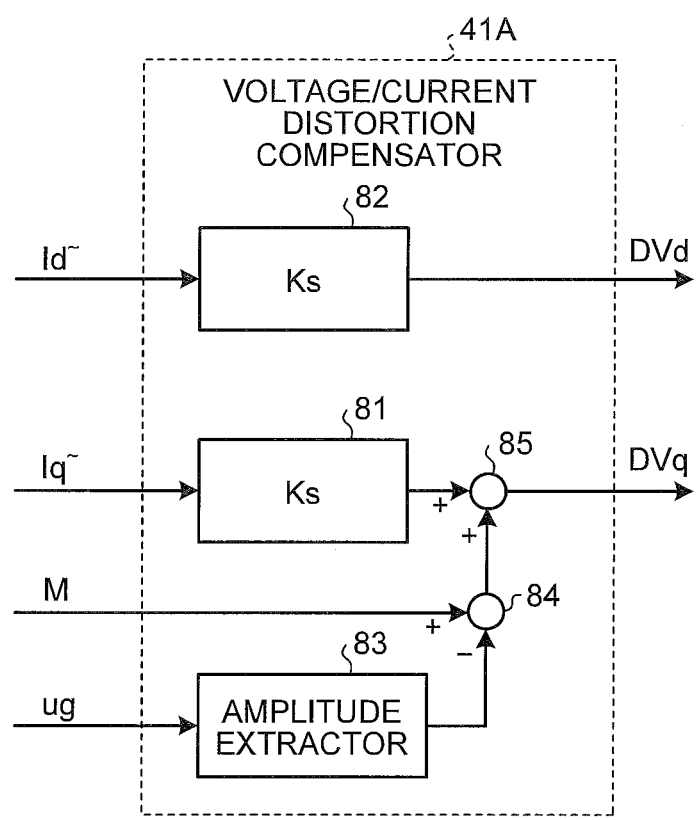
FIG. 10 is a diagram illustrating a configuration example of the current/voltage distortion compensator in FIG. 9.

FIG. 10 is a diagram illustrating a configuration example of the voltage/current distortion compensator 41A. As illustrated in FIG. 10, the voltage/current distortion compensator 41A includes amplifiers 81, 82, an amplitude extractor 83, a subtractor 84, and an adder 85. The amplitude extractor 83 computes the amplitude of the output voltage ug, based on the output voltage ug. The subtractor 84 subtracts the amplitude of the output voltage ug from the amplitude M of the AC voltage reference Ug*. The adder 85 generates the q-axis distortion compensation value DVq by adding a differential value between the amplitude M of the AC voltage reference Ug and the amplitude of the output voltage ug to the output of the amplifier 81.

As described above, the power converter 2A according to the second embodiment adjusts the q-axis distortion compensation value DVq in accordance with the difference between the amplitude M of the AC voltage reference Ug* and the amplitude of the output voltage ug, thereby suppressing a distortion of the output voltage ug, in addition to a distortion of the output current ig.

3. Third Embodiment

A power converter in a power generation system according to a third embodiment will now be described. The power converter according to the third embodiment differs from the power converters 2, 2A according to the first and second embodiments in that the percent modulation is adjusted in the boost controller. The third embodiment has the same configuration as the power generation system according to the foregoing embodiments except the configuration of the boost controller of the power converter, and illustration and description thereof are omitted. The components having the same function as in the power converters in the foregoing embodiments are denoted with the same reference signs, and an overlapping description is omitted.

Figure 11:
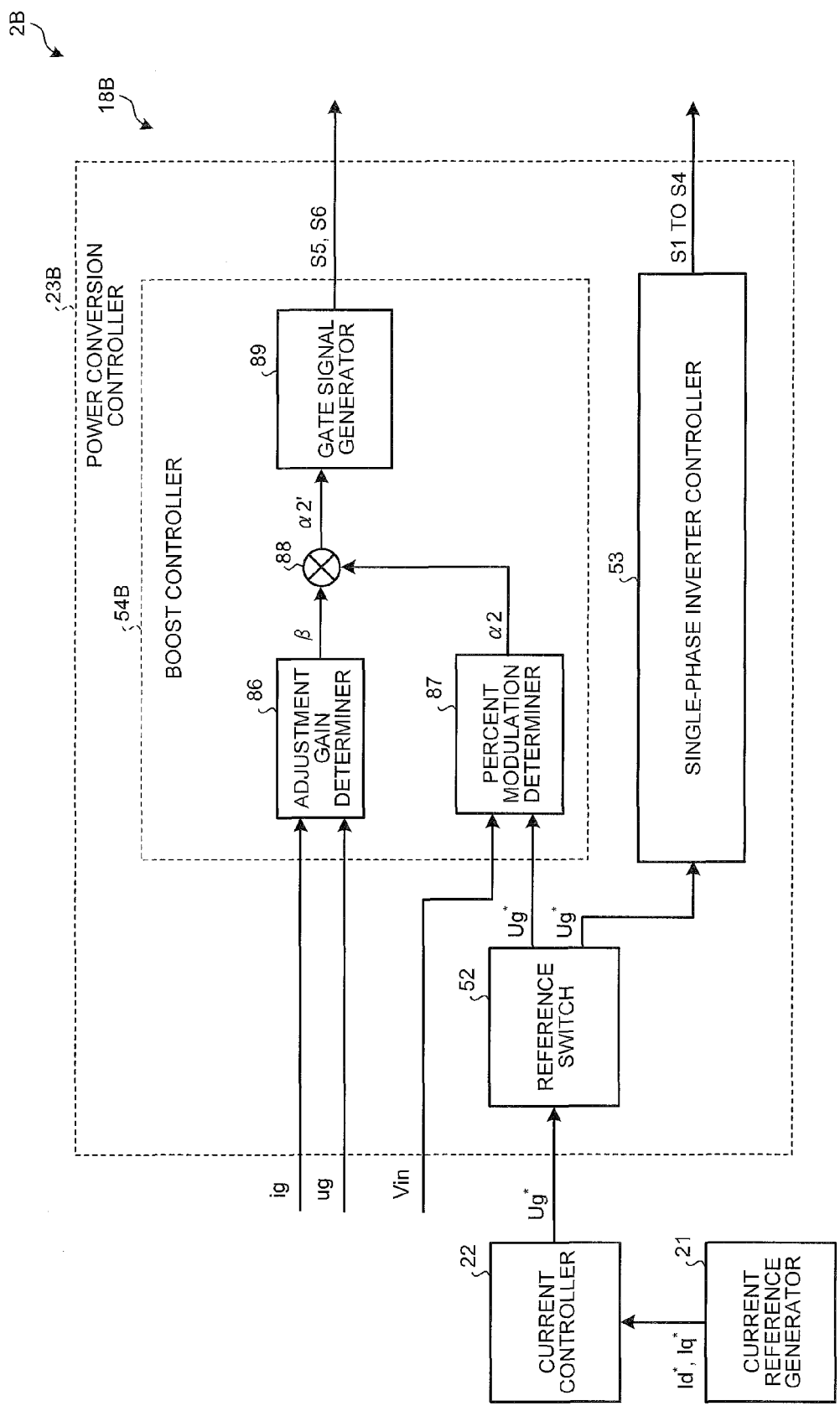
FIG. 11 is a diagram illustrating a configuration example of the controller of the power converter according to a third embodiment.

FIG. 11 is a diagram illustrating a configuration example of a controller 18B of a power converter 2B according to the third embodiment. As illustrated in FIG. 11, the controller 18B includes a current reference generator 21, a current controller 22, and a power conversion controller 23B. The power conversion controller 23B includes a reference switch 52, a single-phase inverter controller 53, and a boost controller 54B.

When the boost circuit 10 is controlled based on the percent modulation $\alpha 2$ computed from the AC voltage reference Ug* and the bus voltage ug, the output voltage ug decreases as the output current ig increases in some cases. The power converters 2, 2A according to the first and second embodiments may therefore not easily generate the output voltage ug with the percent modulation $\alpha 2$ with higher accuracy, depending on the magnitude of the output current ig.

The boost controller 54B according to the third embodiment then generates the output voltage ug with high accuracy by adjusting the percent modulation $\alpha 2$ with an adjustment gain $\beta$ based on the output current ig. The boost controller 54B includes an adjustment gain determiner 86, a percent modulation determiner 87, a multiplier 88, and a gate signal generator 89.

Figure 12:
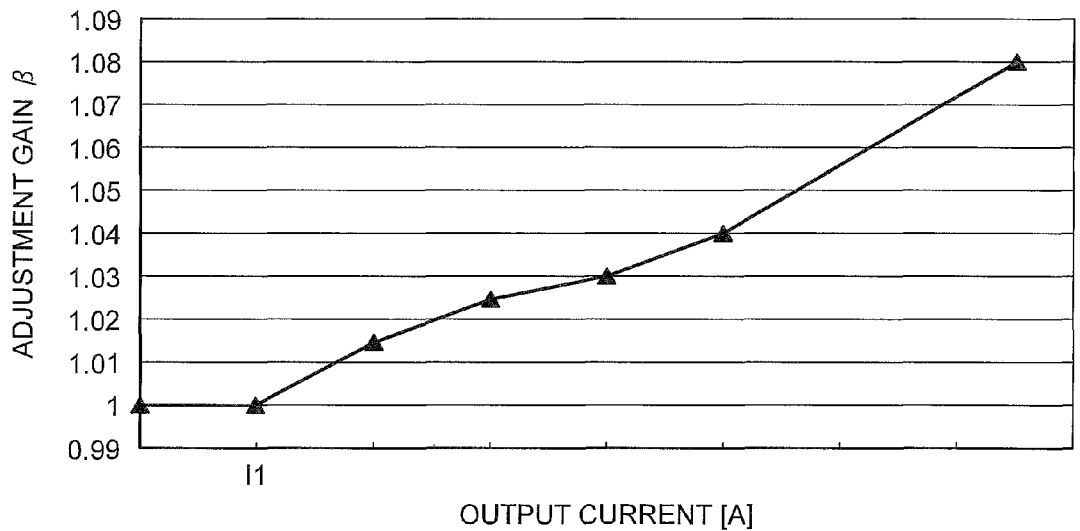
FIG. 12 is a diagram illustrating an example of the relation between adjustment gain and output current.

The adjustment gain determiner 86 computes the adjustment gain $\beta$, for example, based on the output current ig. For example, the adjustment gain determiner 86 stores a table or an arithmetic expression having the relation between the output current ig and the adjustment gain $\beta$ and obtains the adjustment gain $\beta$ based on the table or arithmetic expression. FIG. 12 is a diagram illustrating an example of the relation between the adjustment gain $\beta$ and the output current ig. In the example illustrated in FIG. 12, if the output current ig exceeds I1. [A], the adjustment gain $\beta$ increases as the output current ig increases.

The percent modulation determiner 87 obtains the percent modulation $\alpha 2$, for example, through computation of the equation (4) above. The multiplier 88 obtains a percent modulation $\alpha 2'$ by multiplying the percent modulation $\alpha 2$ by the adjustment gain $\beta$. The gate signal generator 89 compares the percent modulation $\alpha 2'$ with the carrier signal to generate a pair of PWM signals in which the Low level and the High level are reversed. The gate signal generator 89 outputs the generated pair of PWM signals as a pair of gate signals S5, S6. Reduction of the output voltage ug depending on the magnitude of the output current ig thus can be prevented, thereby generating the output voltage ug with high accuracy.

The adjustment gain determiner 86 may compute the adjustment gain $\beta$ based on the output current ig and the output voltage ug. In this case, the adjustment gain determiner 86 determines an output power pg, for example, from the output current ig and the output voltage ug, and determines the adjustment gain $\beta$ corresponding to the output power pg. The adjustment gain determiner 86 stores, for example, a table or an arithmetic expression having the relation between the output power pg and the adjustment gain $\beta$ and can obtain the adjustment gain $\beta$ based on the table or arithmetic expression.

As described above, the boost controller 54B according to the third embodiment adjusts the percent modulation $\alpha 2$ with the adjustment gain $\beta$ and thereby can generate the output voltage ug with high accuracy. The adjustment gain determiner 86 may also output a preset adjustment gain $\beta$ (>1).

4. Fourth Embodiment

A power converter in a power generation system according to a fourth embodiment will now be described. The power converter according to the fourth embodiment differs from the power converters, 2A according to the first and second embodiments in that a current control gain is adjusted in the current controller. The fourth embodiment has the same configuration as the power generation system according to the foregoing embodiments except the configuration of the q-axis current controller and the d-axis current controller in the power converter, and illustration and description thereof are omitted.

Figure 13:
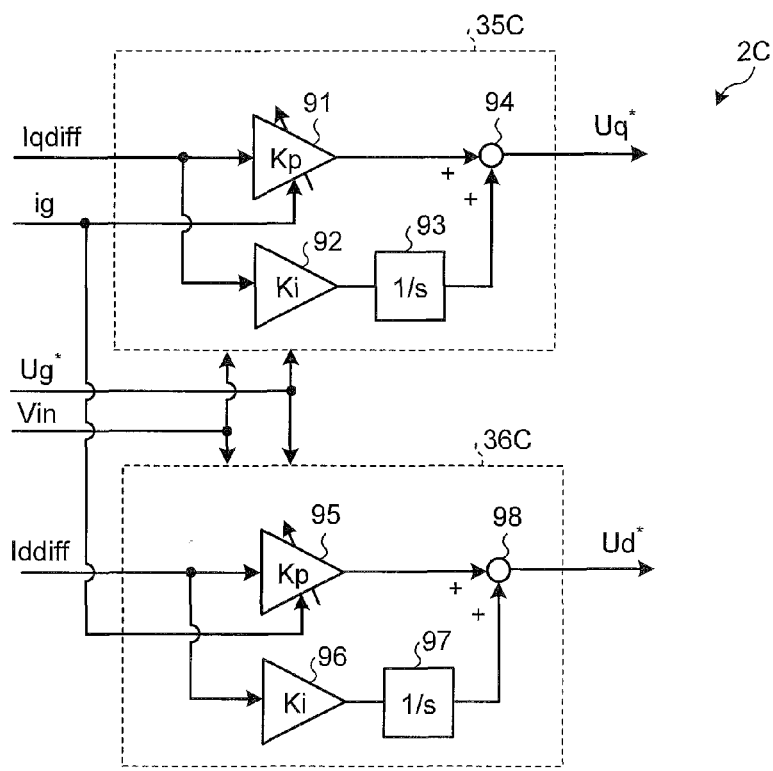
FIG. 13 is a diagram illustrating a configuration example of the q-axis current controller and the d-axis current controller of the power converter according to a fourth embodiment.

FIG. 13 is a diagram illustrating a configuration example of a q-axis current controller 35C and a d-axis current controller 36C in a power converter 2C according to the fourth embodiment. As illustrated in FIG. 13, the q-axis current controller 35C includes amplifiers 91, 92, an integrator 93, and an adder 94.

The amplifier 91 has a proportional gain Kp (an example of the current control gain) and multiplies the q-axis current difference Iqdiff by a factor of Kp to output the product. When the AC voltage reference Ug* is greater than an input voltage Vi, the amplifier 91 adjusts the proportional gain Kp in accordance with the magnitude of the output current ig. For example, the amplifier 91 increases the proportional gain Kp as the output current ig increases. When the AC voltage reference Ug* is equal to or smaller than the input voltage Vi, the proportional gain Kp is a preset value, for example, a value equal to or smaller than the proportional gain Kp in the case where the AC voltage reference Ug* is greater than the input voltage Vi.

The amplifier 92 has an integral gain Ki and multiplies the q-axis current difference Iqdiff by a factor of Ki to output the product. The integrator 93 integrates the Ki-fold q-axis difference signal Iqdiff. The adder 94 adds the output of the amplifier 91 and the integration result of the integrator 93 and outputs the result of addition as a q-axis voltage reference Uq*.

The d-axis current controller 36C includes amplifiers 95, 96, an integrator 97, and an adder 98. This d-axis current controller 36C has the same configuration as the q-axis current controller 35C, in which the proportional gain Kp is adjusted depending on the magnitude of the output current ig.

As described above, the q-axis current controller 35C and the d-axis current controller 36C according to the fourth embodiment adjust the proportional gain Kp when the AC voltage reference Ug* is greater than the input voltage Vi, so that the output voltage ug can be output with high accuracy. The adjustment gain determiner 86 may have a preset proportional gain Kp when the AC voltage reference Ug* is greater than the input voltage Vi, and the proportional gain Kp in this case is greater than the proportional gain Kp in the case where the AC voltage reference Ug* is equal to or smaller than the input voltage Vi.

5. Others

In the foregoing embodiments, the current reference and the voltage reference are generated using the scalar quantity of the d-axis component and the q-axis component, by way of example. However, the current reference and the voltage reference may be generated using the vector quantity alone.

In the foregoing embodiments, the boost control on the boost circuit 10 and the PWM control on the single-phase inverter 11 are switched depending on whether the AC voltage reference Ug* is equal to or greater than the supply voltage Vin, by way of example. However, the condition of switching between the boost control on the boost circuit 10 and the PWM control on the single-phase inverter 11 is not limited to this example.

For example, considering the resistance component of the reactor L1 and the on resistance of the switching element Q6, the boost control on the boost circuit 10 and the PWM control on the single-phase inverter 11 may be switched depending on whether the AC voltage reference Ug* is equal to or smaller than a predetermined voltage Vref0 (<Vin). In a period in which Vref1 (<Vin)<Ug*<Vref2 (>Vin), the boost control on the boost circuit 10 and the PWM control on the single-phase inverter 11 may be performed simultaneously.

In the foregoing embodiments, in the PWM control on the single-phase inverter 11, the PWM signal is generated in accordance with the polarity of the AC voltage reference Ug*. However, the PWM control by the single-phase inverter controller 53 is not limited to the aforementioned example. For example, the single-phase inverter controller 53 may generate a pair of PWM signals in which High and Low are reversed, and one of the pair of PWM signals is set as the gate signals S1, S4 and the other is set as the gate signals S2, S3.

In the PWM control on the single-phase inverter 11, the power conversion controller 23, for example, turns on one of the switching elements Q1, Q4 and turns on/off the other to output a positive voltage from the single-phase inverter 11, and turns on one of the switching elements Q2, Q3 and turns on/off the other to output a negative voltage from the single-phase inverter 11.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power converter comprising:
    a boost circuit configured to boost a voltage of a direct-current (DC) power supply;
    a single-phase inverter configured to output an alternating-current (AC) voltage based on a voltage output from the boost circuit;
    a current controller configured to generate a voltage reference based on a difference between a current output from the single-phase inverter and a current reference; and
    a power conversion controller configured to control the single-phase inverter to generate a first portion of the AC voltage, and to control the boost circuit to generate a second portion of the AC voltage, the first portion according to the voltage reference of which an absolute value is smaller than the voltage of the DC power supply, and the second portion according to the voltage reference of which an absolute value is greater than the voltage of the DC power supply.

2. The power converter according to claim 1, further comprising:
    a maximum power point tracking (MPPT) controller configured to generate a supply voltage reference to maximize a power supplied from the DC power supply to the boost circuit, based on the voltage and a current of the DC power supply; and a supply voltage controller configured to generate the current reference based on a difference between the supply voltage reference and the voltage of the DC power supply.

3. The power converter according to claim 1, wherein the power conversion controller includes:
a boost controller configured to perform boost control on the boost circuit based on the voltage reference;
a single-phase inverter controller configured to perform pulse width modulation (PWM) control on the single-phase inverter based on the voltage reference; and
a switch configured to switch between the boost control of the boost controller and the PWM control of the single-phase inverter controller, based on the voltage reference and the voltage of the DC power supply.

4. The power converter according to claim 1, wherein the current controller includes:
a current distortion extractor configured to extract a distortion component of a current output from the single-phase inverter; and
a corrector configured to correct the voltage reference based on the distortion component extracted by the current distortion extractor, and
the power conversion controller controls the boost circuit and the single-phase inverter based on the voltage reference corrected by the corrector.

5. The power converter according to claim 1, wherein the current controller includes:
a coordinate converter configured to convert a current output from the single-phase inverter into a pair of signals orthogonal to each other on orthogonal coordinates;
a phase detector configured to detect a voltage phase of an AC power supply connected to the single-phase inverter; and
a dq converter configured to convert the pair of signals into a d-axis component and a q-axis component in a dq coordinate system by using rotation coordinate transformation by the voltage phase detected by the phase detector,
the current reference includes a d-axis current reference and a q-axis current reference, and
the current controller generates a d-axis voltage reference based on a difference between the d-axis current reference and the d-axis component and generates a q-axis voltage reference based on a difference between the q-axis current reference and the q-axis component.

6. The power converter according to claim 1, wherein the boost circuit includes:
a reactor having one end connected to the DC power supply;
a first switching element connected in parallel with the DC power supply through the reactor;
a diode connected between the other end of the reactor and the single-phase inverter; and
a second switching element connected in inverse parallel with the diode, and
the power conversion controller alternately turns on the first switching element and the second switching element in a period in which the boost circuit is controlled such that the boost circuit generates the second portion of the AC voltage.

7. The power converter according to claim 6, wherein a set of one or more switching elements of the boost circuit, a set of switching elements of the single-phase inverter, or both of the sets include wide-bandgap semiconductors containing gallium nitride (GaN) or silicon carbide (SiC).

8. The power converter according to claim 1, wherein the power conversion controller adjusts a percent modulation determined based on the voltage reference and the voltage of the DC power supply by using an adjustment gain and controls the boost circuit to generate the second portion of the AC voltage, based on the adjusted percent modulation.

9. The power converter according to claim 1, wherein the current controller sets a current control gain in a case where the voltage reference having an absolute value greater than the voltage of the DC power supply is generated, to be greater than a current control gain in a case where the voltage reference having an absolute value smaller than the voltage of the DC power supply is generated.

10. A power generation system comprising:
the power converter as claimed in claim 1; and
a power generator that supplies DC power to the power converter, the power generator corresponding to the DC power supply.

11. A control apparatus comprising:
a current controller configured to generate a voltage reference based on a difference between a current reference and a current output from a single-phase inverter that outputs an alternating-current (AC) voltage based on a voltage output from a boost circuit that boosts voltage of a direct-current (DC) power supply; and
a power conversion controller configured to control the single-phase inverter to generate a first portion of the AC voltage, and to control the boost circuit to generate a second portion of the AC voltage, the first portion according to the voltage reference of which an absolute value is smaller than the voltage of the DC power supply, and the second portion according to the voltage reference of which an absolute value is greater than the voltage of the DC power supply.

12. A power conversion method comprising:
generating a voltage reference based on a difference between a current reference and a current output from a single-phase inverter that outputs an alternating-current (AC) voltage based on a voltage output from a boost circuit connected to a direct-current (DC) power supply;
boosting, in the boost circuit, a voltage of the DC power supply to a voltage according to the voltage reference, of which an absolute value is greater than the voltage of the DC power supply, to generate a first portion of the AV voltage; and
generating, in the single-phase inverter, a second portion of the AC voltage according to the voltage reference, of which an absolute value is smaller than the voltage of the DC power supply.

* * * * *